(12) United States Patent
Kim et al.

(10) Patent No.: US 8,736,798 B2
(45) Date of Patent: May 27, 2014

(54) OPTICAL ELEMENT

(71) Applicant: LG Chem, Ltd., Seoul (KR)

(72) Inventors: Sin Young Kim, Daejeon (KR); Moon Soo Park, Daejon (KR); Seung Hun Chae, Daejeon (KR); Hyuk Yoon, Gwangmyeong-si (KR)

(73) Assignee: LG Chem Ltd., Seoul (KR)

( * ) Notice: Subject to any disclaimer, the term of this patent is extended or adjusted under 35 U.S.C. 154(b) by 0 days.

(21) Appl. No.: 13/681,178

(22) Filed: Nov. 19, 2012

(65) Prior Publication Data

US 2013/0083262 A1 Apr. 4, 2013

Related U.S. Application Data

(63) Continuation of application No. PCT/KR2011/008589, filed on Nov. 10, 2011.

(30) Foreign Application Priority Data

| Nov. 10, 2010 | (KR) | 10-2010-0111757 |
| Nov. 10, 2010 | (KR) | 10-2010-0111758 |
| Dec. 7, 2010 | (KR) | 10-2010-0124411 |
| Jun. 15, 2011 | (KR) | 10-2011-0057830 |
| Oct. 26, 2011 | (KR) | 10-2011-0110092 |
| Oct. 26, 2011 | (KR) | 10-2011-0110093 |
| Oct. 26, 2011 | (KR) | 10-2011-0110096 |
| Nov. 10, 2011 | (KR) | 10-2011-0117237 |

(51) Int. Cl.
*G02F 1/1335* (2006.01)

(52) U.S. Cl.
USPC ........... 349/117; 349/122; 349/193; 349/194; 349/15; 349/88; 349/183; 349/93; 349/86; 349/96; 428/1.55; 428/1.31

(58) Field of Classification Search
CPC .................................................. G02F 1/133528
USPC ......... 349/122, 193, 194, 15, 117, 88, 93, 86, 349/183; 156/327, 60
See application file for complete search history.

(56) References Cited

U.S. PATENT DOCUMENTS

| 7,175,890 | B2 * | 2/2007 | Verrall et al. ................... 428/1.1 |
| 7,976,669 | B2 * | 7/2011 | Miyatake et al. ............. 156/327 |
| 2004/0127614 | A1 * | 7/2004 | Jiang et al. ..................... 524/270 |
| 2005/0117217 | A1 * | 6/2005 | Yamaoka et al. ............. 359/483 |

(Continued)

FOREIGN PATENT DOCUMENTS

| JP | 10-153707 | | 6/1998 | |
| KR | JP 10-153707 | * | 6/1998 | ............... G02B 5/30 |

(Continued)

*Primary Examiner* — Edward Glick
*Assistant Examiner* — Sang V Nguyen
(74) *Attorney, Agent, or Firm* — McKenna, Long & Aldridge, LLP.

(57) ABSTRACT

An optical element is provided. The optical element shows excellent durability, hardness property and reworkability. Therefore, the optical element can have a stable light division property since the phase retardation property of the phase retardation layer in the optical element can be stably maintained for a long period of time under severe conditions. Also, it is possible to prevent side effects such as light leakage in an optical instrument to which the optical element is applicable. Also, the optical element can show excellent resistance to external pressure or scratches.

20 Claims, 7 Drawing Sheets

(56) References Cited

U.S. PATENT DOCUMENTS

| | | | |
|---|---|---|---|
| 2005/0181148 A1* | 8/2005 | Kim et al. | 428/1.55 |
| 2005/0269020 A1* | 12/2005 | Matsuoka | 156/235 |
| 2006/0007376 A1* | 1/2006 | Fukuda et al. | 349/119 |
| 2007/0091228 A1* | 4/2007 | Itadani et al. | 349/96 |
| 2008/0014374 A1* | 1/2008 | Hirai | 428/1.1 |
| 2008/0291377 A1* | 11/2008 | Sekiguchi et al. | 349/114 |
| 2009/0190213 A1* | 7/2009 | Tamura et al. | 359/465 |
| 2009/0251642 A1* | 10/2009 | Nakamura et al. | 349/75 |
| 2009/0279030 A1* | 11/2009 | Toyama et al. | 349/117 |

FOREIGN PATENT DOCUMENTS

| | | |
|---|---|---|
| KR | 1020080075779 | 8/2008 |
| KR | 1020090073021 | 7/2009 |
| KR | 1020090082065 | 7/2009 |

* cited by examiner

FIG. 3

| A | B | A | B | A | B |
|---|---|---|---|---|---|
| B | A | B | A | B | A |
| A | B | A | B | A | B |
| B | A | B | A | B | A |
| A | B | A | B | A | B |
| B | A | B | A | B | A |

FIG. 11

| LG | RG | LG | RG | LG | RG |
|----|----|----|----|----|----|
| RG | LG | RG | LG | RG | LG |
| LG | RG | LG | RG | LG | RG |
| RG | LG | RG | LG | RG | LG |
| LG | RG | LG | RG | LG | RG |
| RG | LG | RG | LG | RG | LG |

OPTICAL ELEMENT

CROSS-REFERENCE TO RELATED APPLICATION

This application is a continuation application of PCT/KR2011/008589, filed on Nov. 10, 2011, and claims priority to Korean Patent Application Nos. 10-2010-0111758, filed Nov. 10, 2010; 10-2010-0111757, filed Nov. 10, 2010; 10-2010-0124411, filed Dec. 7, 2010; 10-2011-0057830, filed Jun. 15, 2011; 10-2011-0110092, filed Oct. 26, 2011; 10-2011-0110093, filed Oct. 26, 2011; 10-2011-0110096, filed Oct. 26, 2011 and 10-2011-0117237, filed Nov. 10, 2011, all of which are incorporated by reference in their entirety herein.

BACKGROUND

1. Field of the Invention

The present invention relates to an optical element and a stereoscopic image display device.

2. Discussion of Related Art

Techniques of dividing light into two or more kinds of light having different polarized states may be effectively used in various fields.

The light division techniques may be, for example, applied to manufacture of stereoscopic images. The stereoscopic images may be realized using binocular parallax. For example, when two 2-dimensional images are input into the human left and right eyes, respectively, the input information is transmitted and combined in the brain, which makes it possible for a human being to experience 3-dimensional (3D) senses of depth and reality. Therefore, the light division techniques may be used during this procedure.

Techniques of generating a stereoscopic image may be effectively used for 3D measurements, and also used in 3D TV, cameras or computer graphics.

SUMMARY OF THE INVENTION

The present invention is directed to providing an optical element and a stereoscopic image display device.

One aspect of the present invention provides an optical element. The optical element according to one exemplary embodiment of the present invention may include a phase retardation layer, a polarizing plate attached to the phase retardation layer by means of a first pressure-sensitive adhesive layer, and a second pressure-sensitive adhesive layer formed on the polarizing plate in a position opposite to the phase retardation layer. FIG. 1 is a schematic diagram showing the optical element 1. Here, the optical element 1 has a structure in which the phase retardation layer 11, the first pressure-sensitive adhesive layer 121, the polarizing plate 13 and the second pressure-sensitive adhesive layer 122 are sequentially formed.

According to one exemplary embodiment, the term optical element may include all kinds of optical instruments, optical parts or optical devices, each of which exhibits one or more optically intended functions. According to one exemplary embodiment, the optical element may also mean an element having a sheet or film shape. For example, the optical element may be an element that divides incident light into two or more kinds of light having different polarized states. Such an element may be, for example, used to obtain a stereoscopic image.

The phase retardation layer includes a liquid crystal layer, the liquid crystal layer may include a polymerizable liquid crystal compound, and the polymerizable liquid crystal compound may be included in the liquid crystal layer in a polymerized form.

In this specification, the term "polymerizable liquid crystal compound" may refer to a compound including a region showing a liquid crystalline property, for example, a mesogen backbone, and also including at least one polymerizable functional group. Also, in this specification, the expression "a polymerizable liquid crystal compound being included in a polymerized form" may refer to a state in which the liquid crystal compound may be polymerized to form a backbone in the liquid crystal layer, such as a main chain or a side chain of the liquid crystal polymer.

According to one exemplary embodiment, the polymerizable liquid crystal compound included in the liquid crystal layer may include a multifunctional polymerizable liquid crystal compound and a monofunctional polymerizable liquid crystal compound.

In this specification, the term "multifunctional polymerizable liquid crystal compound" may refer to a compound including at least two polymerizable functional groups in the liquid crystal compound. According to one exemplary embodiment, the multifunctional polymerizable liquid crystal compound may include 2 to 10, 2 to 8, 2 to 6, 2 to 5, 2 to 4, 2 to 3, or 2 polymerizable functional groups.

Also, the term "monofunctional polymerizable liquid crystal compound" may refer to a compound including one polymerizable functional group in the liquid crystal compound.

When the multifunctional and monofunctional polymerizable compound is used, phase retardation properties of the liquid crystal layer may be effectively regulated, and the obtained phase retardation properties, for example, the optical axis of the phase retardation layer or a phase retardation value, may be stably maintained. In this specification, the term "optical axis" may refer to a slow axis or fast axis when light penetrates through a corresponding region.

The multifunctional or monofunctional polymerizable liquid crystal compound may, for example, be a compound represented by the following Formula 1.

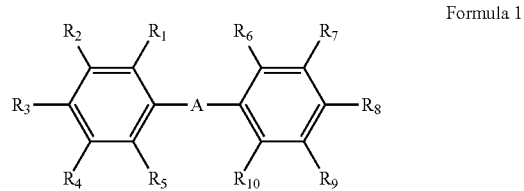

Formula 1

In Formula 1, A is a single bond, —COO— or —COO—, and $R_1$ to $R_{10}$ are each independently hydrogen, a halogen, an alkyl group, an alkoxy group, an alkoxycarbonyl group, a cyano group, a nitro group, —O-Q-P or a substituent of the following Formula 2, provided that at least one of the substituents $R_1$ to $R_{10}$ is —O-Q-P or a substituent of the following Formula 2, or two adjacent substituents of $R_1$ to $R_5$ or two adjacent substituents of $R_6$ to $R_{10}$ are joined together to form a benzene ring substituted with —O-Q-P, where Q is an alkylene group or an alkylidene group, and P is a polymerizable functional group such an alkenyl group, an epoxy group, a cyano group, a carboxyl group, an acryloyl group, a methacryloyl group, an acryloyloxy group or a methacryloyloxy group.

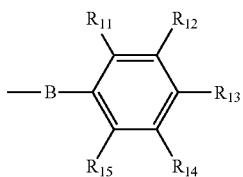

Formula 2

In Formula 2, B is a single bond, —COO— or —COO—, and $R_{11}$ to $R_{15}$ are each independently hydrogen, a halogen, an alkyl group, an alkoxy group, an alkoxycarbonyl group, a cyano group, a nitro group or —O-Q-P, provided that at least one of substituents $R_{11}$ to $R_{15}$ is —O-Q-P, or two adjacent substituents of $R_{11}$ to $R_{15}$ are joined together to form a benzene ring substituted with —O-Q-P. In Formula 2, Q is an alkylene group or an alkylidene group, and P is a polymerizable functional group such as an alkenyl group, an epoxy group, a cyano group, a carboxyl group, an acryloyl group, a methacryloyl group, an acryloyloxy group or a methacryloyloxy group.

In Formulas 1 and 2, the expression "two adjacent substituents are joined together to form a benzene ring substituted with —O-Q-P" may mean that the two adjacent substituents are joined together to form a naphthalene backbone substituted with —O-Q-P as a whole.

In Formula 2, "—" indicated on the left side of B may mean that B is directly bound to the benzene ring of Formula 1.

In Formulas 1 and 2, the term "single bond" means that no additional atoms are present at the part marked with A or B. For example, when A in Formula 1 is a single bond, the benzene rings disposed on both sides of A may be directly bound to form a biphenyl structure.

In Formulas 1 and 2, the halogen may be chlorine, bromine or iodine.

Unless otherwise defined in this specification, the term "alkyl group" may refer to a linear or branched alkyl group having 1 to 20 carbon atoms, 1 to 16 carbon atoms, 1 to 12 carbon atoms, 1 to 8 carbon atoms or 1 to 4 carbon atoms, or a cycloalkyl group having 3 to 20 carbon atoms, 3 to 16 carbon atoms or 4 to 12 carbon atoms. The alkyl group may be optionally substituted with one or more substituents.

Unless otherwise defined in this specification, the term "alkoxy group" may refer to an alkoxy group having 1 to 20 carbon atoms, 1 to 16 carbon atoms, 1 to 12 carbon atoms, 1 to 8 carbon atoms or 1 to 4 carbon atoms. The alkoxy group may be linear, branched or cyclic. Also, the alkoxy group may be optionally substituted with one or more substituents.

Also, unless otherwise defined in this specification, the term "alkylene group or alkylidene group" may refer to an alkylene group or alkylidene group having 1 to 12 carbon atoms, 4 to 10 carbon atoms or 6 to 9 carbon atoms. The alkylene group or alkylidene group may be linear, branched or cyclic. Also, the alkylene group or alkylidene group may be optionally substituted with one or more substituents.

Also, unless otherwise defined in this specification, the term "alkenyl group" may refer to an alkenyl group having 2 to 20 carbon atoms, 2 to 16 carbon atoms, 2 to 12 carbon atoms, 2 to 8 carbon atoms or 2 to 4 carbon atoms. The alkenyl group may be linear, branched or cyclic. Also, the alkenyl group may be optionally substituted with one or more substituents.

Also, in Formulas 1 and 2, P may be preferably an acryloyl group, a methacryloyl group, an acryloyloxy group or a methacryloyloxy group, more preferably an acryloyloxy group or a methacryloyloxy group, and most preferably an acryloyloxy group.

In this specification, the substituent which may be substituted with a certain functional group may be an alkyl group, an alkoxy group, an alkenyl group, an epoxy group, an oxo group, an oxetanyl group, a thiol group, a cyano group, a carboxyl group, an acryloyl group, a methacryloyl group, an acryloyloxy group, a methacryloyloxy group or an aryl group, but the present invention is not limited thereto.

The —O-Q-P which may be present in plural numbers in Formula 1 and 2 or the residue of Formula 2 may be, for example, present in a position of $R_3$, $R_8$ or $R_{13}$. Preferably, $R_3$ and $R_4$, or $R_{12}$ and $R_{13}$ may be joined together to form a benzene ring substituted with —O-Q-P. Also, in the compound of Formula 1 or the residue of Formula 2, the substituent other than the —O-Q-P or the residue of Formula 2, or the residues other than those being joined together to form the benzene ring may be, for example, hydrogen, a halogen, a linear or branched alkyl group having 1 to 4 carbon atoms, an alkoxycarbonyl group containing a linear or branched alkoxy group having 1 to 4 carbon atoms, a cycloalkyl group having 4 to 12 carbon atoms, a cyano group, an alkoxy group having 1 to 4 carbon atoms, or a nitro group, and preferably chlorine, a linear or branched alkyl group having 1 to 4 carbon atoms, a cycloalkyl group having 4 to 12 carbon atoms, an alkoxy group having 1 to 4 carbon atoms, an alkoxycarbonyl group containing a linear or branched alkoxy group having 1 to 4 carbon atoms, or a cyano group.

The liquid crystal layer may include the monofunctional polymerizable liquid crystal compound in an amount of greater than 0 parts by weight and less than 100 parts by weight, 1 part by weight to 90 parts by weight, 1 part by weight to 80 parts by weight, 1 part by weight to 70 parts by weight, 1 part by weight to 60 parts by weight, 1 part by weight to 50 parts by weight, 1 part by weight to 30 parts by weight or 1 part by weight to 20 parts by weight, relative to 100 parts by weight of the multifunctional polymerizable liquid crystal compound. The mixing of the multifunctional and monofunctional polymerizable liquid crystal compounds may be maximized within this content range. Unless otherwise defined in this specification, the term "unit part by weight" may mean a weight ratio.

In the liquid crystal layer, the polymerizable liquid crystal compound may be horizontally aligned. The term "horizontal alignment" may mean that the optical axis of a liquid crystal layer including a polymerized or unpolymerized liquid crystal compound has an inclination angle of approximately 0° to approximately 25°, approximately 0° to approximately 15°, approximately 0° to approximately 10°, approximately 0° to approximately 5°, or approximately 0° with respect to a plane of the liquid crystal layer.

The liquid crystal layer has a difference between in-plane refractive indexes in a slow axis direction and a fast axis direction of 0.05 to 0.2, 0.07 to 0.2, 0.09 to 0.2, or 0.1 to 0.2. As such, the in-plane refractive index in the slow axis direction may refer to a refractive index in a direction in which the maximum value of the refractive index is defined with respect to the plane of the liquid crystal layer, and the in-plane refractive index in the fast axis direction may refer to a refractive index in a direction in the minimum value of the refractive index is defined with respect to the plane of the liquid crystal layer. In general, the fast axis and slow axis in an optically anisotropic liquid crystal layer are formed perpendicularly to each other. The refractive indexes may be measured with respect to light at a wavelength of 550 nm or 589 nm.

The liquid crystal layer may also have a thickness of approximately 0.5 μm to 2.0 μm or approximately 0.5 μm to 1.5 μm.

The liquid crystal layer satisfying the relationship of the refractive indexes and having the thickness may express a phase retardation property suitable for use in applications. For example, the liquid crystal layer satisfying the relationship of the refractive indexes and having the thickness may be suitable for use in an optical element for optical division. When the optical element is used to display a stereoscopic image, it is possible to prevent a so-called crosstalk caused by unsuitable optical division.

The liquid crystal layer may be formed so that incident light, for example, light passing through the polarizing plate, can be divided into two or more kinds of light having different polarized states. Therefore, the liquid crystal layer may include, for example, at least first and second regions having different phase retardation properties. In this specification, the fact that the first and second regions have the different phase retardation properties may include a case in which the first and second regions have optical axes formed in the same or different direction and also have different phase retardation values in a state where both the first and second regions have the phase retardation properties, and a case in which the first and second regions have optical axes formed in different directions while having the same phase retardation value. According to another exemplary embodiment, the fact that the first and second regions have the different phase retardation properties may include a case in which one of the first and second regions has a phase retardation property, and the other region is an optically isotropic region having no phase retardation property. In this case, for example, a layer made of a liquid crystal material may be formed on some regions of the liquid crystal layer, and the layer of the liquid crystal material may not be formed on the other regions. The phase retardation property of the first or second region may be regulated, for example, by controlling an alignment state of the liquid crystal compound, the refractive index relationship of the liquid crystal layer or a thickness of the liquid crystal layer.

According to one exemplary embodiment, the first region A and the second region B may be formed in stripe shapes extending in the same direction and alternately arranged adjacent to each other, as shown in FIG. 2, or they may be formed in a lattice pattern and alternately arranged adjacent to each other, as shown in FIG. 3.

When the optical element is used to display a stereoscopic image, one of the first and second regions may refer to a region configured to control polarization of an image signal for the left eye (hereinafter referred to as "LC region"), and the other region may refer to a region configured to control polarization of an image signal for the right eye (hereinafter referred to as "RC region").

In addition, according to one exemplary embodiment, the two or more kinds of light having the different polarized states, which are divided by the liquid crystal layer including the first and second regions, may include two kinds of linearly polarized light having directions of polarization substantially perpendicular to each other, or include left-circularly polarized light and right-circularly polarized light.

Therefore, according to one exemplary embodiment, one of the first and second regions may be a region through which incident light penetrates without rotating the polarization axis of the incident light, and the other region may be a region through which incident light penetrates while the polarization axis of the incident light is rotated in a direction perpendicular to the polarization axis of the incident light which penetrates through the one of the first and second regions. As described above, the regions of the liquid crystal layer including the polymerizable liquid crystal compound may be formed on only one of the first and second regions. As such, the regions in which the liquid crystal layer is not formed may be empty, or may be a region in which a free or optically isotropic resin layer, resin film or sheet is present.

According to another exemplary embodiment, one of the first and second regions may be a region through which incident light may penetrate when the incident light is converted into left-circularly polarized light, and the other region may be a region through which incident light may penetrate when the incident light is converted into right-circularly polarized light. In this case, the first and second regions have optical axes formed in different directions while having the same phase retardation value, or one of the first and second regions may be a region in which incident light may be phase-retarded by ¼ of a wavelength of the incident light, and the other region may be a region in which incident light may be phase-retarded by ¾ of a wavelength of the incident light.

According to one exemplary embodiment, the first and second regions may have the same phase retardation value, for example, a value required to phase-retard incident light by ¼ of the wavelength of the incident light, and also have optical axes formed in different directions. As such, the angles of the optical axes forming in the different directions may be, for example, perpendicular.

When the first and second regions have the optical axes formed in different directions, a line bisecting an angle formed between the optical axes of the first and the second regions is preferably drawn so that the line can be perpendicular or parallel with respect to the absorption axis of the polarizer included in the polarizing plate.

FIG. 4 is a schematic diagram explaining the arrangement of the optical axes of the first and second regions when the first regions A and the second regions B shown in FIG. 2 or 3 have optical axes formed in different directions. Referring to FIG. 4, a line bisecting an angle formed between the optical axes of the first regions A and the second regions B may refer to a line bisecting an angle of $(\Theta 1 + \Theta 2)$. For example, when $\Theta 1$ and $\Theta 2$ have the same angle, the angle-bisecting line may be formed in a direction parallel with respect to a boundary line L between the first regions A and the second regions B. As such, an angle, namely $(\Theta 1 + \Theta 2)$, formed between the optical axes of the first regions A and the second regions B may also be, for example, 90°.

Unless otherwise defined in this specification, when terms such as vertical, horizontal, perpendicular or parallel are used in definitions of angles, the terms refer to an angle being substantially vertical, horizontal, perpendicular or parallel. For example, the terms include errors in consideration of manufacturing errors or variations. Therefore, the terms may, for example, include an error of not more than approximately ±15°, preferably an error of not more than approximately ±10°, and most preferably an error of not more than approximately ±5°.

The phase retardation layer may include a substrate layer having a liquid crystal layer formed therein. FIG. 5 is a schematic diagram showing a structure of an optical element 4 including a substrate layer 41 formed on a liquid crystal layer 11.

For example, a glass substrate layer or a plastic substrate layer may be used as the substrate layer. Examples of the plastic substrate layer may include a sheet or film including a cellulose resin such as triacetyl cellulose (TAC) or diacetyl cellulose (DAC); a cyclo olefin polymer (COP) such as a norbornene derivative; an acryl resin such as poly(methyl methacrylate) (PMMA); polycarbonate (PC); a polyolefin such as polyethylene (PE) or polypropylene (PP); polyvinyl alcohol (PVA); poly ether sulfone (PES); polyetheretherketone (PEEK); polyetherimide (PEI); polyethylene naphthalate (PEN); a polyester such as polyethylene terepthalate (PET); polyimide (PI); polysulfone (PSF); or a fluorine resin.

The substrate layer, for example, the plastic substrate layer, may have a lower refractive index than the liquid crystal layer. The refractive index of the substrate layer according to one exemplary embodiment is in a range of approximately 1.33 to approximately 1.53. When the substrate layer has a lower refractive index than the liquid crystal layer, it is, for example, desirable to enhance luminance, prevent reflection and improve contrast characteristics.

The plastic substrate layer may be optically isotropic or anisotropic. As such, when the substrate layer is optically anisotropic, the optical axis of the substrate layer is preferably arranged so that the optical axis of the substrate layer can be perpendicular or parallel with respect to the above-mentioned line bisecting an angle formed between the optical axes of the first region and the second region.

According to one exemplary embodiment, the substrate layer may include an ultraviolet (UV) protector or a UV ray absorbent. When the substrate layer include the UV protector or absorbent, it is possible to prevent degradation of the liquid crystal layer caused by UV rays. Examples of the UV protector or absorbent include an organic matter such as a salicylic acid ester compound, a benzophenone compound, an oxybenzophenone compound, a benzotriazol compound, a cyanoacrylate compound or a benzoate compound, or an inorganic matter such as a nickel complex salt. The content of the UV protector or absorbent in the substrate layer is not particularly limited, and may be properly selected in consideration of desired effects. For example, in the manufacture of the plastic substrate layer, the UV protector or absorbent may be included in an amount of approximately 0.1% by weight to 25% by weight, based on the weight ratio of the main material of the substrate layer.

A thickness of the substrate layer is not particularly limited, and may be properly regulated according to desired purpose of use. The substrate layer may have a single-layer or multilayer structure.

The optical element according to one exemplary embodiment may further include an alignment layer disposed between the substrate layer and the liquid crystal layer. The alignment layer may serve to align a liquid crystal compound during formation of the optical element. As the alignment layer, a conventional alignment layer known in the art, for example, an photo alignment layer, an alignment layer formed using a (nano-) imprinting method, or a rubbing alignment layer may be used. The alignment layer is a optional composition, and may optionally have an alignment property without using an alignment layer by directly rubbing or elongating the substrate layer.

The polarizing plate included in the optical element may include a polarizer. The polarizer is a functional element that can extract light vibrating in one direction from incident light while vibrating in various directions. According to one exemplary embodiment, the polarizer may have a light absorption axis formed in a predetermined direction and a light transmission axis vertical to the light absorption axis. For example, a conventional polarizer such as a PVA polarizer may be used as the polarizer.

A protection layer(s) may be formed on one surface or both surfaces of the polarizer. Examples of the protection layer may include a cellulose resin film such as TAC or DAC, a resin film such as an amorphous polyolefin film, a polyester film, an acryl resin film, a PC film, a PSF film, an alicyclic PI film or a COP film, or a resin layer cured by electromagnetic waves such as UV rays.

The optical element includes a first pressure-sensitive adhesive layer configured to attach the phase retardation layer and the polarizing plate, and a second pressure-sensitive adhesive layer formed on the polarizing plate.

As such, the second pressure-sensitive adhesive layer may be a pressure-sensitive adhesive layer configured to attach the optical element to an optical instrument. As such, examples of the optical instrument may include, for example, a liquid crystal panel of a liquid crystal display device or an image display element of a stereoscopic image display device.

At least one of the first and second pressure-sensitive adhesive layers may have a storage modulus at 25° C. of 0.02 MPa or more, 0.03 MPa or more, 0.04 MPa or more, 0.05 MPa or more, 0.06 MPa or more, 0.07 MPa or more, 0.08 MPa, greater than 0.08 MPa, or 0.09 MPa or more. When at least one of the first and second pressure-sensitive adhesive layers has a storage modulus of this range, an upper limit of the storage modulus is not particularly limited. For example, the storage modulus may be 0.25 MPa or less, 0.2 MPa or less, 0.16 MPa or less, 0.1 MPa or less or 0.08 MPa or less. In the optical element, the second pressure-sensitive adhesive layer may have at least the storage modulus of this range, and preferably a storage modulus greater than 0.08 MPa.

When the first or second pressure-sensitive adhesive layer has this storage modulus, the optical element may show excellent durability, and thus show a stable light division property since the phase retardation property of the phase retardation layer is, for example, stably maintained for a long period of time under the severe conditions. Also, it is possible to prevent side effects such as light leakage in optical instruments using the optical element. In addition, the optical element may show excellent resistance to an external pressure or scratch due to its improved hardness property, thereby properly maintaining reworkability.

The first or second pressure-sensitive adhesive layer has a thickness of 25 μm or less, 20 μm or less or 18 μm or less. When the pressure-sensitive adhesive layer has this thickness, the durability, hardness property and reworkability may be further improved. The pressure-sensitive adhesive layers show excellent physical properties as the pressure-sensitive adhesive layers become thin. Here, an upper limit of the thickness is not particularly limited, but the thickness of the pressure-sensitive adhesive layers may be, for example, adjusted within a range of approximately 1 μm to approximately 5 μm in consideration of processability.

Each of the pressure-sensitive adhesive layers may include an acryl pressure-sensitive adhesive, a silicon pressure-sensitive adhesive, an epoxy pressure-sensitive adhesive or a rubber-based pressure-sensitive adhesive.

When the pressure-sensitive adhesive layer includes an acryl pressure-sensitive adhesive, the pressure-sensitive adhesive may be, for example, formed by curing a pressure-sensitive adhesive composition including a thermocurable component, an active energy ray-curable component, or both the thermocurable component and the active energy ray-curable component.

The term "curing" may mean a change in a chemical or physical state of a pressure-sensitive adhesive composition to express a pressure-sensitive adhesive property. As such, the thermocurable component and active energy ray-curable component may also refer to a component which is cured by application of suitable heat or irradiation of active energy rays. As such, the "active energy rays" may include particle beams such as alpha-particle beams, proton beams, neutron beams or electron beams, as well as microwaves, infrared rays (IR), UV rays (UV), X rays and gamma rays. In general, the UV rays or electron beams may be used herein.

The pressure-sensitive adhesive layer formed of a pressure-sensitive adhesive composition including a thermocurable component may include an acrylic polymer which is cross-linked using a multifunctional cross-linking agent.

As the acrylic polymer cross-linked using the multifunctional cross-linking agent, for example, an acrylic polymer having a weight average molecular weight of 500,000 or more may be used. In this specification, the weight average molecular weight is a value converted from that of a polystyrene standard as measured using gel permeation chromatography (GPC). Also, unless otherwise defined in this specification, the term "molecular weight" means a "weight average molecular weight." A polymer having a molecular weight of 500,000 or more may be used to form a pressure-sensitive adhesive layer having excellent durability under severe conditions. An upper limit of the molecular weight is not particularly limited, and may be, for example, adjusted within 2,500,000 or less in consideration of the durability or a coating property of a composition.

According to one exemplary embodiment, the acrylic polymer may include a (meth)acrylic acid ester monomer and a cross-linking monomer as a polymerization unit.

For example, alkyl(meth)acrylate may be used as the (meth)acrylic acid ester-based monomer, and alkyl(meth)acrylate containing an alkyl group having 1 to 20 carbon atoms may be used in consideration of the cohesion, glass transition temperature or pressure-sensitive adhesivity of a pressure-sensitive adhesive. Examples of such a monomer may include methyl(meth)acrylate, ethyl(meth)acrylate, n-propyl(meth)acrylate, isopropyl(meth)acrylate, n-butyl (meth)acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl(meth)acrylate, isooctyl (meth)acrylate, isononyl(meth)acrylate, lauryl(meth)acrylate and tetradecyl(meth)acrylate, which may be used alone or in combination.

In addition the polymer may further include a cross-linking monomer as a polymerization unit. For example, the polymer may include 80 parts by weight to 99.9 parts by weight of the (meth)acrylic acid ester monomer and 0.1 parts by weight to 20 parts by weight of the cross-linking monomer as polymerization units. As such, the term "cross-linking monomer" refers to a monomer that can be copolymerized with another monomer used to form an acrylic polymer and provide a cross-linking functional group to the polymer after the copolymerization. The cross-linking functional group may react with a multifunctional cross-linking agent as will be described later to form a cross-linking structure.

Examples of the cross-linking functional group may include a hydroxyl group, a carboxyl group, an epoxy group, and a nitrogen-containing functional group such as an isocyanate group or an amino group. Copolymerizable monomers which can provide the above-mentioned cross-linking functional group in manufacture of a pressure-sensitive adhesive resin are widely known in the art. Examples of the cross-linking monomer may include, but the present invention is not limited to, a hydroxyl group-containing monomer such as 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate or 2-hydroxypropyleneglycol(meth)acrylate; a carboxyl group-containing monomer such as (meth)acrylic acid, 2-(meth)acryloyloxy acetic acid, 3-(meth)acryloyloxy propyl acid, 4-(meth)acryloyloxy butyric acid, an acrylic acid dimer, itaconic acid, maleic acid or maleic anhydride; or a nitrogen-containing monomer such as (meth)acrylamide, N-vinyl pyrrolidinone or N-vinyl caprolactam, which may be used alone or in combination.

Other various monomers may be included in the acrylic polymer as a polymerization unit, when necessary.

For example, the acrylic polymer may further include a compound represented by the following Formula 3 as a polymerization unit.

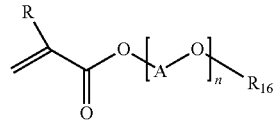

Formula 3

In Formula 3, R represents hydrogen or an alkyl group, A represents an alkylene group or an alkylidene group, $R_{16}$ represents an alkyl group or an aryl group, and n represents an integer of 1 to 6.

When a pressure-sensitive adhesive layer includes a cross-linking structure of an active energy ray component as will be described later, for example, the compound of Formula 3 may be useful in enhancing compatibility between the cross-linking structure of the active energy ray component and a cross-linking structure of a thermocurable component and maintaining the physical properties of the pressure-sensitive adhesive layer in an appropriate range.

Unless otherwise defined in this specification, the term "aryl group" may refer to a monovalent residue derived from a compound or a derivative thereof, which includes a benzene ring or has a structure in which two or more benzene rings are condensed or joined. The aryl group may be, for example, an aryl group having 6 to 22 carbon atoms, preferably 6 to 16 carbon atoms, and more preferably 6 to 13 carbon atoms, such as a phenyl group, a phenylethyl group, a phenylpropyl group, a benzyl group, a tolyl group, a xylyl group or a naphthyl group.

In Formula 3, n may be more preferably an integer of 1 to 25, further preferably 1 to 15, and most preferably 1 to 6.

Examples of the monomer of Formula 3 may include alkoxy alkylene glycol(meth)acrylic acid ester, alkoxy dialkylene glycol(meth)acrylic acid ester, alkoxy trialkylene glycol(meth)acrylic acid ester, alkoxy tetraalkylene glycol (meth)acrylic acid ester, alkoxy polyethylene glycol(meth) acrylic acid ester, phenoxy alkylene glycol(meth)acrylic acid ester, phenoxy dialkylene glycol(meth)acrylic acid ester, phenoxy trialkylene glycol(meth)acrylic acid ester, phenoxy tetraalkylene glycol(meth)acrylic acid ester or phenoxy polyalkylene glycol(meth)acrylic acid ester.

When the compound of Formula 3 is included, a weight ratio of the compound may be properly adjusted according to purpose. For example, the compound may be included in an amount of 10 parts by weight to 50 parts by weight, based on the weight of the other monomer.

In addition to the above-described compounds, the polymer may, for example, further include a nitrogen-containing monomer such as (meth)acrylonitrile, (meth)acrylamide, N-methyl(meth)acrylamide or N-butoxy methyl(meth)acrylamide; a styrene-based monomer such as styrene or methyl styrene; glycidyl(meth)acrylate; or a optional monomer such as carboxylic acid vinyl ester (for example, vinyl acetate) as a polymerization unit. Such additional monomers may be adjusted to a content of 20 parts by weight or less, based on the total weight ratio of the other monomer.

The acrylic polymer may be prepared by subjecting a mixture of monomers obtained by optionally selecting and blending the above-described components through a polymerization method such as solution polymerization, photopolymerization, bulk polymerization, suspension polymerization or emulsion polymerization. Examples of the multifunctional cross-linking agent serving to cross-link the above-described acrylic polymer in the pressure-sensitive adhesive layer may include conventional thermocurable cross-linking agents such as an isocyanate cross-linking agent, an epoxy cross-linking agent, an aziridine cross-linking agent and a metal chelate cross-linking agent. As such, examples of the isocyanate cross-linking agent may include a multifunctional isocyanate compound such as tolylene diisocyanate, xylene diisocyanate, diphenylmethane diisocyanate, hexamethylene diisocyanate, isoboron diisocyanate, tetramethylxylene diisocyanate or naphthalene diisocyanate, or a compound obtained by reacting the multifunctional isocyanate compound with a polyol compound such as trimethylol propane. Examples of the epoxy cross-linking agent may include at least one selected from the group consisting of ethyleneglycol diglycidyl ether, triglycidyl ether, trimethylolpropane triglycidyl ether, N,N,N',N'-tetraglycidyl ethylenediamine and glycerin diglycidyl ether, examples of the aziridine cross-linking agent may include at least one selected from the group consisting of N,N'-toluene-2,4-bis(1-aziridine-carboxamide), N,N'-diphenylmethane-4,4'-bis(1-aziridine-carboxamide), triethylene melamine, bisisoprotaloyl-1-(2-methylaziridine) and tri-1-aziridinylphosphine oxide, and examples of the metal chelate cross-linking agent may include compounds obtained by coordinating a polyvalent metal such as aluminum, iron, zinc, tin, titanium, antimony, magnesium or vanadium with acetylacetone or ethyl acetoacetate, but the present invention is not limited thereto.

The multifunctional cross-linking agent present in a pressure-sensitive adhesive composition including a thermocurable component or a pressure-sensitive adhesive layer formed of the composition may be, for example, included in an amount of 0.01 parts by weight to 10 parts by weight or 0.01 parts by weight to 5 parts by weight, relative to 100 parts by weight of the acrylic polymer. When a content ratio of the cross-linking agent is adjusted to a content of 0.01 parts by weight or more, it is possible to effectively maintain cohesion of a pressure-sensitive adhesive, whereas, when the content ratio of the cross-linking agent is adjusted to a content of 10 parts by weight or less, it is possible to prevent interlayer detachment or delamination from being caused in the pressure-sensitive adhesive interface and maintain excellent durability. However, the weight ratio may be varied according to desired physical properties such as elastic modulus or inclusion of other cross-linking structures in the pressure-sensitive adhesive layer.

The pressure-sensitive adhesive layer formed of the pressure-sensitive adhesive composition including the active energy ray-curable component may include a cross-linking structure of a polymerized active energy ray-polymerizable compound. The pressure-sensitive adhesive layer may be, for example, formed by blending a compound including at least one functional group which can take part in a polymerization reaction by irradiation of active energy rays, such as, for example, an alkenyl group, an acryloyl group, a methacryloyl group, an acryloyloxy group or a methacryloyloxy group to prepare a pressure-sensitive adhesive composition, and cross-linking and polymerizing the component by irradiating the composition with active energy rays. As such, examples of the compound including the functional group which can take part in the polymerization reaction by irradiation of the active energy rays may include a polymer obtained by introducing a functional group such as an acryloyl group, a methacryloyl group, an acryloyloxy group or a methacryloyloxy group into a side chain of the acrylic polymer; a compound known as an active energy ray-curable oligomer in the art, such as urethane acrylate, epoxy acrylate, polyester acrylate or polyether acrylate; or a multifunctional acrylate as will be described later.

The pressure-sensitive adhesive layer formed of the pressure-sensitive adhesive composition including a thermocurable component and an active energy ray-curable component may have both a cross-linking structure including an acrylic polymer cross-linked using a multifunctional cross-linking agent and a cross-linking structure including a polymer of active energy ray-polymerizable compound.

Such a pressure-sensitive adhesive layer is a pressure-sensitive adhesive including an interpenetrating polymer network (hereinafter referred to as "IPN"). The term "IPN" may refer to a state where at least two cross-linking structures are present in a pressure-sensitive adhesive layer. According to one exemplary embodiment, the cross-linking structures may be present in a state of entanglement, linking or penetration. When the pressure-sensitive adhesive layer includes the IPN, the pressure-sensitive adhesive layer may show excellent durability under the severe conditions, and also may be used to realize an optical element having excellent workability or an excellent ability to prevent light leakage or crosstalk.

In the pressure-sensitive adhesive layer including the IPN, as the acrylic polymer and the multifunctional cross-linking agent constituting the cross-linking structure realized by the acrylic polymer cross-linked by the multifunctional cross-linking agent, for example, the components described in the pressure-sensitive adhesive composition including the thermocurable component may be used.

Also, as the active energy ray-polymerizable compound in the cross-linking structure realized by the polymerized active energy ray-polymerizable compound, for example, the active energy ray-polymerizable compound as described above may be used.

According to one exemplary embodiment, the active energy ray-polymerizable compound may be a multifunctional acrylate. Compounds having at least two (meth)acryloyl groups may be used as the multifunctional acrylate without limitation. For example, a difunctional acrylate such as 1,4-butanediol di(meth)acrylate, 1,6-hexanediol di(meth)acrylate, neopentylglycol di(meth)acrylate, polyethylene glycol di(meth)acrylate, neopentylglycol adipate di(meth)acrylate, hydroxyl puivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol(meth)acrylate, dimethylol dicyclopentane di(meth)acrylate, ethyleneoxide-modified hex ahydrophthalic di(meth)acrylate, tricyclodecane dimethanol(meth)acrylate, neopentylglycol-modified trimethylpropane di(meth)acrylate, adamantane di(meth)acrylate or 9,9-bis[4-(2-acryloyloxyethoxy)phenyl]fluorene; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane(meth)acrylate or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; and a hexafunctional acrylate such as dipentaerythritol hexa(meth)

acrylate, caprolactone-modified dipentaerythritol hexa(meth)acrylate or urethane(meth)acrylate (for example, a reaction product of an isocyanate monomer and trimethylolpropane tri(meth)acrylate, etc.) may be used.

Compounds having a ring structure at the molecule may be used as the multifunctional acrylate. The ring structure included in the multifunctional acrylate may be one of a carbocyclic structure or heterocyclic structure; and a monocyclic or polycyclic structure. Examples of the multifunctional acrylate having a ring structure may include a monomer having an isocyanurate structure, such as tris(meth)acryloxy ethyl isocyanurate, and a hexafunctional acrylate such as isocyanate-modified urethane(meth)acrylate (for example, a reaction product of an isocyanate monomer and trimethylolpropane tri(meth)acrylate, etc.), but the present invention is not limited thereto.

The active energy ray-polymerizable compound constituting the cross-linking structure in the pressure-sensitive adhesive layer including the IPN may be, for example, included in an amount of 5 to 40 parts by weight, relative to 100 parts by weight of the acrylic polymer, but the content of the active energy ray-polymerizable compound may be varied when necessary.

In addition to the above-described components, the pressure-sensitive adhesive layer may include various additives known in the art.

For example, the composition including the active energy ray-curable component may further include a photoinitiator to facilitate a polymerization reaction of the components. Also, the pressure-sensitive adhesive layer may further include at least one additive selected from the group consisting of a silane coupling agent, a pressure-sensitive adhesivity-providing resin, an epoxy resin, a curing agent, a UV stabilizer, an antioxidant, a toning agent, a reinforcing agent, a filler, an antifoaming agent, a surfactant and a plasticizer.

The pressure-sensitive adhesive layer may be formed, for example, by coating and curing a pressure-sensitive adhesive composition prepared by blending the above-described components using a tool such as a bar coater or a comma coater. Also, a method of curing a pressure-sensitive adhesive composition is not particularly limited. For example, the pressure-sensitive adhesive composition may be cured through a process of maintaining a composition at an appropriate temperature to perform a cross-linking reaction of the acrylic polymer and the multifunctional cross-linking agent, and a process of irradiating a composition with active energy rays to polymerize the active energy ray-curable compound. When both of the process of maintaining a composition at an appropriate temperature and the process of irradiating a composition with active energy rays are required to be performed, the processes may be performed sequentially or simultaneously. As such, the irradiation with the active energy rays may be, for example, performed using a high-pressure mercury lamp, an electrodeless lamp or a xenon lamp, and the conditions such as a wavelength or light intensity of the irradiated active energy rays may be selected to properly perform polymerization of the active energy ray-curable compound.

In the optical element, the first or second pressure-sensitive adhesive layer may be formed by selecting a proper pressure-sensitive adhesive from the kinds of the above-described pressure-sensitive adhesives. According to one exemplary embodiment, the second pressure-sensitive adhesive layer may be at least a pressure-sensitive adhesive layer including the IPN, and the first pressure-sensitive adhesive layer may be a pressure-sensitive adhesive layer having a cross-linking structure of the thermocurable component, for example, a cross-linking structure including an acrylic polymer cross-linked using a multifunctional cross-linking agent or a pressure-sensitive adhesive layer including the IPN.

The modulus and kind of the first or second pressure-sensitive adhesive layer may be more properly selected according to a specific structure of the optical element.

According to one exemplary embodiment, the phase retardation layer may further include a substrate layer formed on the liquid crystal layer. Also, the optical element may further include a protective substrate layer attached to the substrate layer by means of a third pressure-sensitive adhesive layer.

FIG. 6 is a schematic diagram of an optical element 5 having the above-described structure, showing a structure of the optical element 5 in which a protective substrate layer 51 is attached to a substrate layer 41 formed on a liquid crystal layer 11 by means of a third pressure-sensitive adhesive layer 123. An optical element 6 having such a structure may further include a surface-treated layer 61 as will be described above, which is, for example, formed on a surface of the protective substrate layer 51, as shown in FIG. 7.

As such, the substrate layer as described previously may be used as the substrate layer 41 formed on the liquid crystal layer 11, and a substrate layer selected from the same category as the substrate layer 41 may also be used as the protective substrate layer 51.

In the structure, the second pressure-sensitive adhesive layer 122 may be a pressure-sensitive adhesive layer having a storage modulus at 25° C. of 0.02 MPa or more, 0.05 MPa or more, greater than 0.08 MPa, greater than 0.08 MPa and 0.25 MPa or less, 0.09 MPa to 0.2 MPa, or 0.09 MPa to 0.16 MPa. The second pressure-sensitive adhesive layer may be a pressure-sensitive adhesive layer including the IPN.

In the structure, the first pressure-sensitive adhesive layer may also be a pressure-sensitive adhesive layer having a cross-linking structure of the thermocurable component or including the IPN. The first pressure-sensitive adhesive layer may have a storage modulus at 25° C. of 0.02 MPa or more, 0.05 MPa or more, or greater than 0.08 MPa. Also, when the first pressure-sensitive adhesive layer is a pressure-sensitive adhesive layer having a cross-linking structure of the thermocurable component, the storage modulus at 25° C. may be adjusted to a range of 0.02 MPa to 0.08 MPa, or 0.04 MPa to 0.08 MPa, and when the first pressure-sensitive adhesive layer is a pressure-sensitive adhesive layer including the IPN, the storage modulus at 25° C. may be adjusted to a range of greater than 0.08 MPa and 0.25 MPa or less, 0.09 MPa to 0.2 MPa, or 0.09 MPa to 0.16 MPa.

As such, a pressure-sensitive adhesive layer having the same storage modulus and cross-linking component as the first pressure-sensitive adhesive layers 121 or second pressure-sensitive adhesive layers 122 may be used as the third pressure-sensitive adhesive layer 123.

According to one exemplary embodiment, a pressure-sensitive adhesive layer having a storage modulus at 25° C. of 0.02 MPa or more, 0.05 MPa or more, greater than 0.08 MPa, greater than 0.08 MPa and 0.25 MPa or less, 0.09 MPa to 0.2 MPa, or 0.09 MPa to 0.16 MPa and including the IPN may be used as the third pressure-sensitive adhesive layer 123.

According to another exemplary embodiment, the optical element further includes a substrate layer formed on the liquid crystal, and may also include a surface-treated layer formed on a surface of the substrate layer.

FIG. 8 is a schematic diagram of an optical element 7 having the above-described structure, showing a structure of the element 7 including a substrate layer 41 formed on the liquid crystal layer 11 and a surface-treated layer 61 formed on a surface of the substrate layer 41.

In such a structure, the second pressure-sensitive adhesive layer may have a storage modulus at 25° C. of 0.02 MPa or more, 0.05 MPa or more, greater than 0.08 MPa, greater than 0.08 MPa and 0.25 MPa or less, 0.09 MPa to 0.2 MPa, or 0.09 MPa to 0.16 MPa, and the first pressure-sensitive adhesive layer may have a storage modulus at 25° C. of 0.02 MPa to 0.08 MPa or 0.04 MPa to 0.08 MPa. As such, the second pressure-sensitive adhesive layer may be a pressure-sensitive adhesive layer including the IPN, and the first pressure-sensitive adhesive layer may be a pressure-sensitive adhesive layer having a cross-linking structure of the thermocurable component.

In the optical element, the surface-treated layer may be formed on the protective substrate layer or the substrate layer formed on the liquid crystal layer, as described above.

Examples of the surface-treated layer may include a high-hardness layer, a glare-preventing layer such as an anti-glare (AG) or semi-glare (SG) layer, and a low refractive layer such as an anti-reflection or low-reflection layer.

The surface-treated layer is formed on one main surface or both main surfaces of the substrate layer, or may be formed on all of the surfaces of the substrate layer (including side surfaces), when necessary.

The high-hardness layer may have a pencil hardness of 1H or more or 2H or more at a load of 500 g. The pencil hardness may be, for example, measured according to the ASTM D 3363 standard using pencil leads prescribed in KS G 2603.

The high-hardness layer may be, for example, a resin layer having high hardness. The resin layer may, for example, include a room-temperature-curable, moisture-curable, thermocurable or active energy ray-curable resin composition in a cured state. According to one exemplary embodiment, the resin layer may include a thermocurable or active energy ray-curable resin composition, or an active energy ray-curable resin composition in a cured state. In description of the high-hardness layer, the term "cured state" may refer to a state where components included in each resin composition are subjected to a cross-linking reaction or a polymerization reaction to convert the resin composition into a hard state. As such, the room-temperature-curable, moisture-curable, thermocurable or active energy ray-curable resin composition may also refer to a composition whose cured state may be induced at room temperature or induced in the presence of suitable moisture or by application of heat or irradiation with active energy rays.

A variety of resin compositions which can satisfy this range of pencil hardness when they are cured are known in the art, and a suitable resin composition may be readily selected by a person of ordinary skill in the art.

According to one exemplary embodiment, the resin composition may include an acryl compound, an epoxy compound, a urethane-based compound, a phenol compound or a polyester compound as a main component. As such, the term "compound" may be a monomeric, oligomeric or polymeric compound.

According to one exemplary embodiment, an acryl resin composition has excellent optical properties such as transparency and superior yellowing resistance, preferably an active energy ray-curable acryl resin composition, may be used as the resin composition.

The active energy ray-curable acryl composition may, for example, include an active energy ray-polymerizable polymer component and a reactive diluting monomer.

As such, examples of the polymer component may include a component generally known in the art as an active energy ray-polymerizable oligomer, such as urethane acrylate, epoxy acrylate, ether acrylate or ester acrylate, or a polymerization product of a mixture including a monomer such as a (meth)acrylic acid ester monomer. As such, examples of the (meth)acrylic acid ester monomer may include alkyl(meth) acrylate, (meth)acrylate having an aromatic group, heterocyclic(meth)acrylate or alkoxy(meth)acrylate. A variety of polymer components used to prepare the active energy ray-curable composition are known in the art, and the above-described compounds may be selected, when necessary.

The reactive diluting monomer that may be included in the active energy ray-curable acryl composition may be a monomer having one or two or more active energy ray-curable functional groups, for example, acryloyl groups or methacryloyl groups; the (meth)acrylic acid ester monomer; or the multifunctional acrylate. As such, a suitable kind of the multifunctional acrylate may be selected from the compounds listed in the items of the pressure-sensitive adhesive.

The selection of the components and a blending ratio of the selected components used to prepare the active energy ray-curable acryl composition are not particularly limited, and may be adjusted in consideration of desired hardness and other physical properties of the resin layer.

For example, a resin layer having a concavo-convex surface formed therein or a resin layer including particles may be used as the anti-glare (AG) or semi-glare (SG) layer. Also, the resin layer includes particles having a different refractive index form the resin layer.

A resin layer used for formation of the high-hardness layer may be, for example, used as the resin layer. When the AG layer is formed, the components of the resin composition may not necessarily be adjusted so that the resin layer can show high hardness, or the resin layer may be formed so that it can show the high hardness.

As such, a method of forming an concavo-convex surface on a resin layer is not particularly limited. For example, the concavo-convex structure may be realized by curing the resin composition while keeping a coating layer of the resin composition in contact with a mold having a desired concavo-convex structure, or by blending particles having suitable particle sizes with a resin composition and coating and curing the resin composition.

The anti-glare layer may also be formed using particles having a different refractive index than the resin layer.

According to one exemplary embodiment, the particles have a difference in refractive index from the resin layer of 0.03 or less or 0.02 to 0.2. When the difference in refractive index is extremely small, it is difficult to induce haze, whereas, when the difference in refractive index is extremely high, scattering in the resin layer may often cause an increase in haze, but light transmittance or contrast characteristics may be degraded. Therefore, suitable particles may be selected in consideration of these facts.

The shape of the particles included in the resin layer is not particularly limited, but may for example be a spherical, oval, polyhedral, amorphous or other shape. The particles may have an average diameter of 50 nm to 5,000 nm. According to one exemplary embodiment, particles with concavo-convex shapes on their surfaces may be used as the particles. Such particles may for example have an average surface roughness (Rz) of 10 nm to 50 nm or 20 nm to 40 nm, and/or a maximum height of concavo-convex shapes formed on the particle surfaces may be in a range of approximately 100 nm to 500 nm or 200 nm to 400 nm, and a width between the concavo-convex shapes may be in a range of 400 nm to 1,200 nm or 600 nm to 1,000 nm. Such particles are highly compatible with the resin layer, and show excellent dispersibility in the resin layer.

Examples of the particles may include various inorganic or organic particles. Examples of the inorganic particles may include silica, amorphous titania, amorphous zirconia, indium oxide, alumina, amorphous zinc oxide, amorphous cerium oxide, barium oxide, calcium carbonate, amorphous barium titanate or barium sulfate, and examples of the organic particles may include particles including a cross-linked or uncross-linked product formed of an organic material such as an acryl resin, a styrene resin, a urethane resin, a melamine resin, a benzoguanamine resin, an epoxy resin or a silicon resin, but the present invention is not limited thereto.

The concavo-convex structure formed in the resin layer or the content of the particles is not particularly limited. For example, in the case of the AG layer, the shape of the concavo-convex structure or the content of the particles may be adjusted so that a haze value of the resin layer may be in a range of approximately 5% to 15%, 7% to 13%, or approximately 10%, and, in the case of the SG layer, they may be adjusted so that a haze value of the resin layer may be in a range of approximately 1% to 3%. The haze value may be measured according to the manufacturer's manual using a hazemeter such as HR-100 or HM-150 (commercially available from SEPUNG).

The AR or LR layer may be formed by coating a low refractive index material. Low refractive index materials which may be used to form the AR or LR layer are widely known in the art. All the low refractive index materials may be properly selected and used in the optical element. The AR or LR layer may be formed through coating of the low refractive index material so that the AR or LR layer can have reflexibility of approximately 1% or less.

In order to form the surface-treated layer, materials disclosed in Korean Patent Publication Nos. 2007-0101001, 2011-0095464, 2011-0095004, 2011-0095820, 2000-0019116, 2000-0009647, 2000-0018983, 2003-0068335, 2002-0066505, 2002-0008267, 2001-0111362, 2004-0083916, 2004-0085484, 2008-0005722, 2008-0063107, 2008-0101801 or 2009-0049557 may also be used.

The surface-treated layer may be formed using the known materials, either alone or in combination. Examples of the combination may include a case where a high-hardness layer is first formed on a surface of a substrate layer and a low-reflection layer is then formed on a surface of the high-hardness layer.

In addition, the optical element may satisfy the conditions of the following Equation 1.

$$X \leq 200 \text{ nm} \quad \text{Equation 1}$$

In Equation 1, X represents a variation in a length or width of the optical element, as measured when the optical element is attached to a glass substrate by means of the second pressure-sensitive adhesive layer and maintained at 60° C. and a relative humidity of 10% for 150 hours, 300 hours or 500 hours.

Also, X may be in a range of 170 nm or less, 150 nm or less, 130 nm or less, 110 nm or less, 90 nm or less, 70 nm or less, 50 nm or less, or 40 nm or less. Since decreasing a value of X means that the optical element has more excellent durability and dimensional stability, a lower limit of X is not particularly limited.

In addition, the present invention is directed to providing a stereoscopic image display device. The stereoscopic image display device according to one exemplary embodiment may include the above-described optical element.

According to one exemplary embodiment, the stereoscopic image display device may further include an image display element that can generate an image signal for the left eye (hereinafter referred to as an "L signal") and an image signal for the right eye (hereinafter referred to as an "R signal"), and the optical element may be attached to the display element by means of the second pressure-sensitive adhesive layer in a state where the first and second regions of the liquid crystal layer are arranged so that the L signal can penetrate through one of the first and second regions and the R signal can penetrate through the other region.

As such, the optical element may be arranged so that the R and L signals can first penetrate through the polarizing plate of the optical element and then enter each region of the liquid crystal layer when the R and L signals are emitted from the display element.

As long as the stereoscopic image display device includes the optical element as a light-dividing element, a variety of methods known in the art may be applied to manufacture of the stereoscopic image display device.

FIG. 9 is a schematic diagram of a device according to one exemplary embodiment, showing the device in which an observer can wear the polarized glasses to observe a stereoscopic image.

As shown in FIG. 9, the device 8 includes, for example, a light source 81, a polarizing plate 82 and an image display element 83, and may have a structure in which the optical element, which sequentially includes a second pressure-sensitive adhesive layer 122, a polarizing plate 13, a first pressure-sensitive adhesive layer 121 and a phase difference layer 11 including a liquid crystal layer, is attached to the display element 83 by means of the second pressure-sensitive adhesive layer 122.

As such, a direct or edge backlight generally used for liquid crystal display devices (LCDs) may be, for example, used as the light source 81.

The display element 83 may be a transmissive liquid crystal display panel including a plurality of unit pixels which are arranged in a row, column or matrix direction. One or two or more pixels are combined to form an image signal-generating region for the right eye for generating an R signal (hereinafter referred to as an "RG region") and an image signal-generating region for the left eye for generating an L signal (hereinafter referred to as an "LG region").

The RG and LG regions may be formed in stripe shapes extending in the same direction and alternately arranged adjacent to each other, as shown in FIG. 10, or they may be formed in a lattice pattern and alternately arranged adjacent to each other, as shown in FIG. 11. In the liquid crystal layer 11 of the optical element, the first and second regions correspond to the LC and RC regions, respectively, and may be arranged in consideration of the arrangement of the RG and LG regions so that the R signal to be transmitted to the RG region can be incident to the RC region via the polarizing plate 13 and the L signal can be incident to the LC region via the polarizing plate 13.

The image display element 83 may, for example, be a liquid crystal panel including a first transparent substrate, a pixel electrode, a first alignment layer, a liquid crystal layer, a second alignment layer, a common electrode, a color filter and a second transparent substrate, which are arranged sequentially in a direction from the light source 81. The polarizing plate 82 may be attached to a side of the panel through which light is incident, for example, one surface of the light source 81, and the optical element may be attached to the other surface, which is arranged opposite to the one surface of the light source 81.

A polarizer included in the polarizing plate 82 and a polarizer included in the polarizing plate 13 of the optical element may be, for example, arranged so that the absorption axes of the two polarizers can be formed at a predetermined angle, for example, at an angle of 90°. Therefore, the arrangement of the two polarizers may allow light emitted from the light source 81 to penetrate through the display element 83 or be intercepted by the display element 83.

In a driving state, unpolarized light may be emitted toward the polarizing plate 82 from the light source 81 of the display device 8. In the light incident to the polarizing plate 82, light having a polarization axis parallel to the light transmission axis of the polarizer of the polarizing plate 82 may penetrate through the polarizing plate 82 and be incident to the display element 83. Light incident to the display element 83 and penetrating through the RG region is converted into an R signal, and light penetrating through the LG region is converted into an L signal, and the R and L signals are then incident to the polarizing plate 13 of the optical element.

In the light incident to the liquid crystal layer 11 through the polarizing plate 13, light penetrating through the LC region and light penetrating through the RC region are emitted, respectively, in a state where two kinds of the light have different polarized states. As described above, the R and L signals having different polarized states may enter the right and left eyes of an observer wearing the polarized glasses, respectively, and thus the observer may observe a stereoscopic image.

BRIEF DESCRIPTION OF THE DRAWINGS

FIGS. 2 and 3 are schematic diagrams showing the arrangement of first and second regions in the optical element.

FIGS. 10 and 11 are schematic diagrams showing the arrangement of an RG region and a LG region.

DETAILED DESCRIPTION OF EXEMPLARY EMBODIMENTS

Hereinafter, the optical element will be described in further detail with reference to Example and Comparative Example, but the range of the optical element is not limited to the following Example.

In the following Examples and Comparative Examples, physical properties of a pressure-sensitive adhesive layer are evaluated, as follows.

1. Evaluation of Storage Modulus

A pressure-sensitive adhesive layer was cut into pieces having a size of 15 cm×25 cm×25 µm (length×width×height), and the cut pressure-sensitive adhesive layers were stacked into a five-layered structure. Thereafter, the stacked pressure-sensitive adhesive layer was cut out into a circular shape having a diameter of 8 mm, and kept overnight while being compressed with glass, thereby improving a wetting property at the interlayer interfaces. Then, a sample was manufactured by removing bubbles generated during a stacking process. The sample was then put on a parallel plate, a gap was adjusted, the normal force and torque were zeroed, and stabilization of the normal force was secured. Then, storage moduli were measured under the following conditions.

Measuring Instrument and Measuring Conditions
Measuring instrument: ARES-RDA, TA Instruments Inc. with forced convection oven Measuring Conditions:
Geometry: 8 mm parallel plate
Gap: around 1 mm
Test type: dynamic strain frequency sweep
Strain=10.0 [%]
Temperature: 30° C.
Initial frequency: 0.4 rad/s
Final frequency: 100 rad/s 2. Evaluation of Phase Difference and Refractive Index The phase difference and refractive index of an optical element or a liquid crystal layer were evaluated according to the manufacturer's manual using Axoscan (commercially available from Axomatrix).

3. Evaluation of Thickness and Width or Length of Optical Element

The width or length of an optical element was measured using 3-dimensional equipment, Premium 600C and IView Pro program (INTEK IMS Co., Ltd.). Also, measurement of the thickness was performed using a spectral reflectometer, which is equipment that is able to evaluate characteristics of a thin film using interference between light reflected on a surface of the thin film and light reflected on an interface disposed under the thin film or phase difference of light.

4. Crosstalk Evaluation

Figure 1:
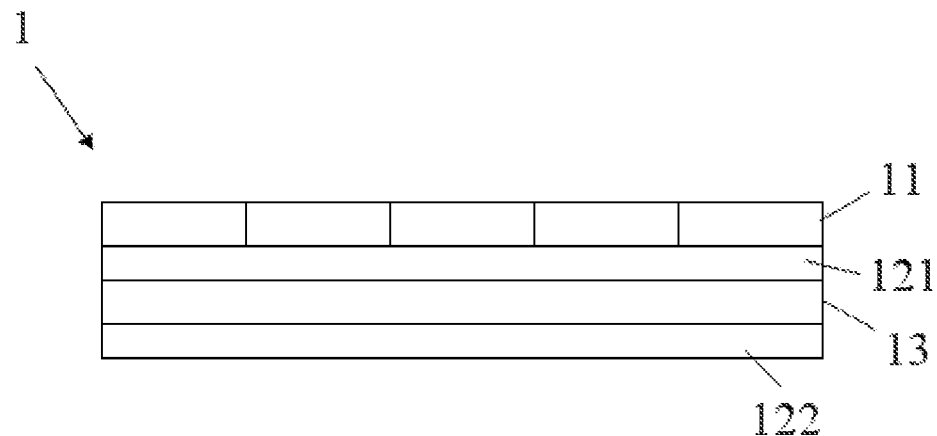
FIG. 1 is a schematic diagram showing an optical element.
Figure 2:
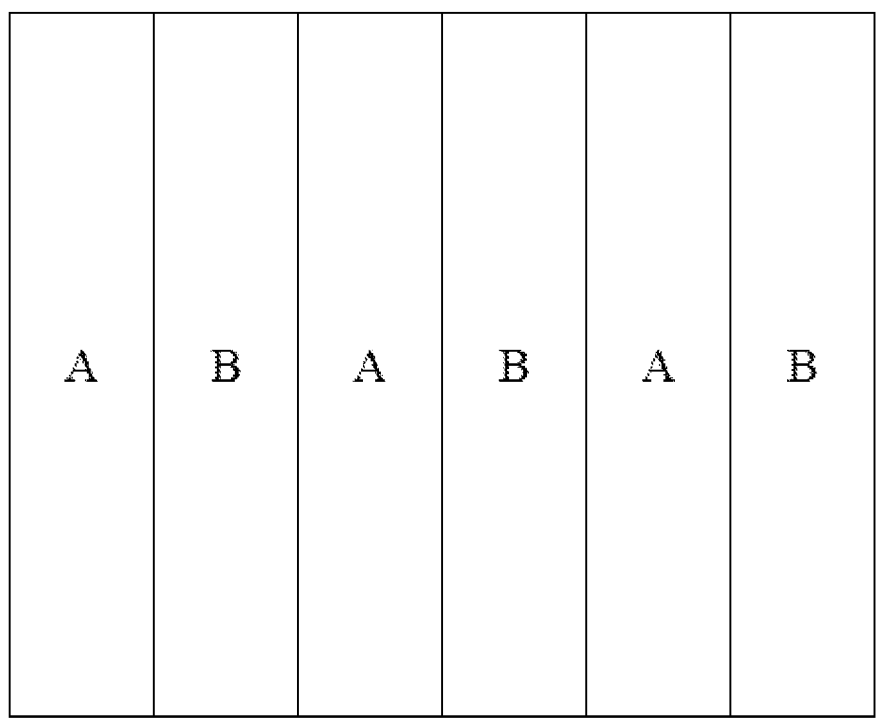
Figure 4:
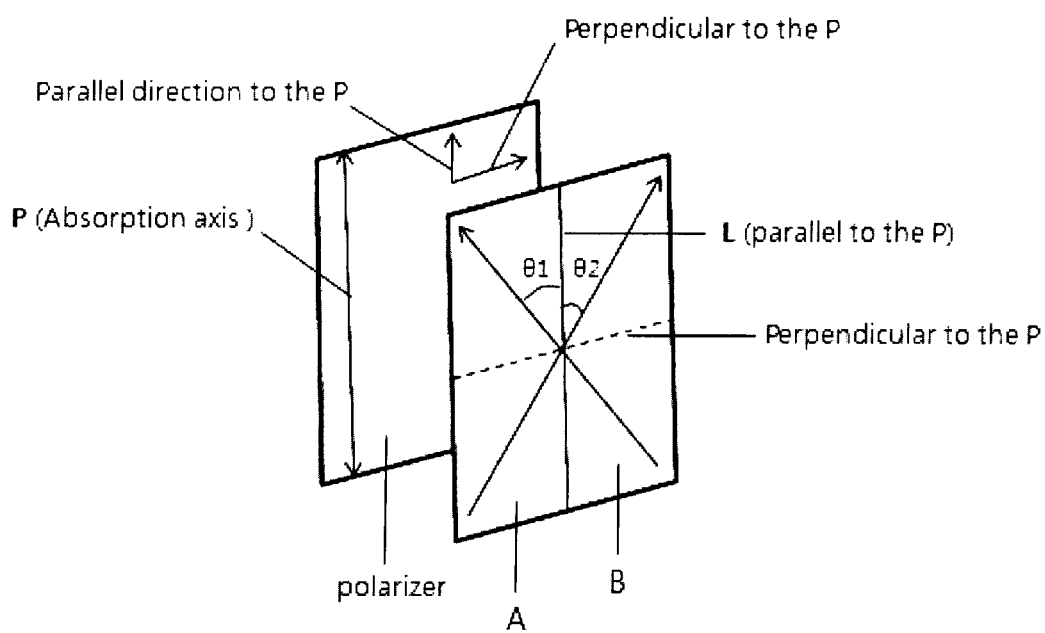
FIG. 4 is a schematic diagram explaining the arrangement of the optical axes of the first and second regions.
Figure 5:
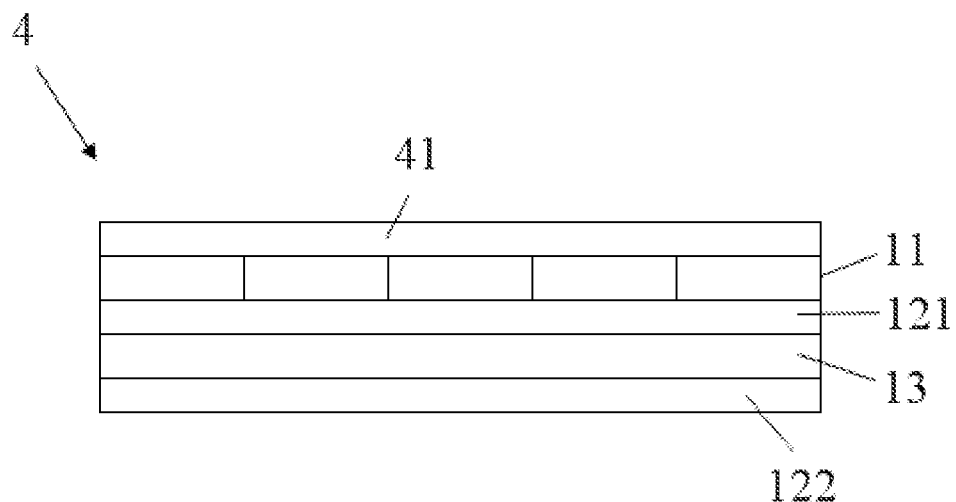
FIGS. 5 to 8 are schematic diagrams showing an optical element.
Figure 6:
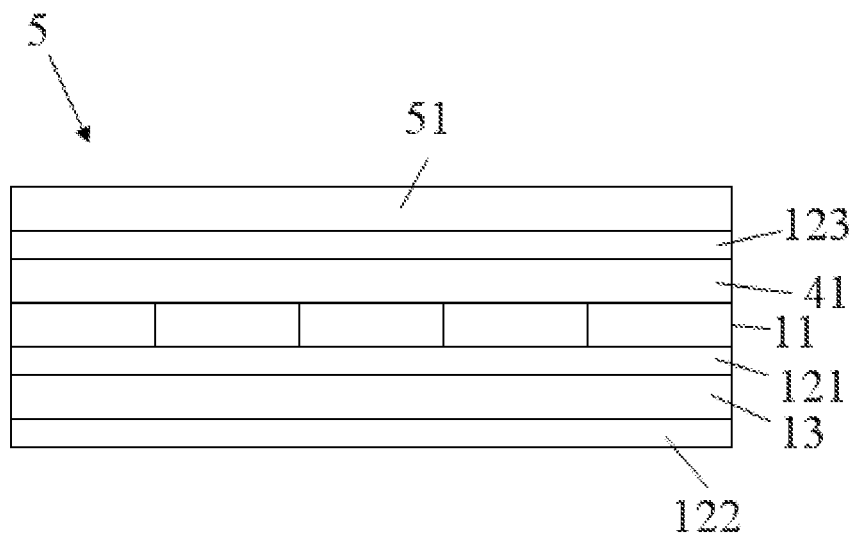
Figure 7:
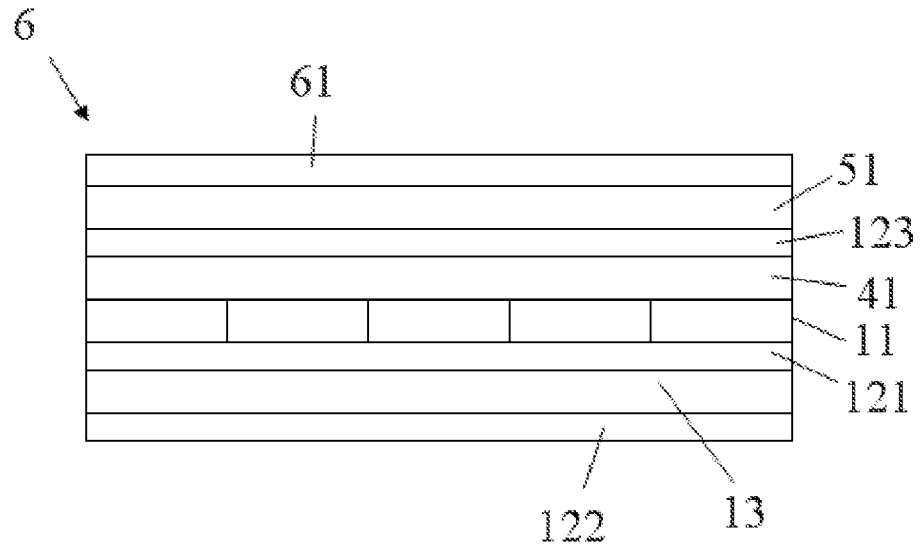
Figure 8:
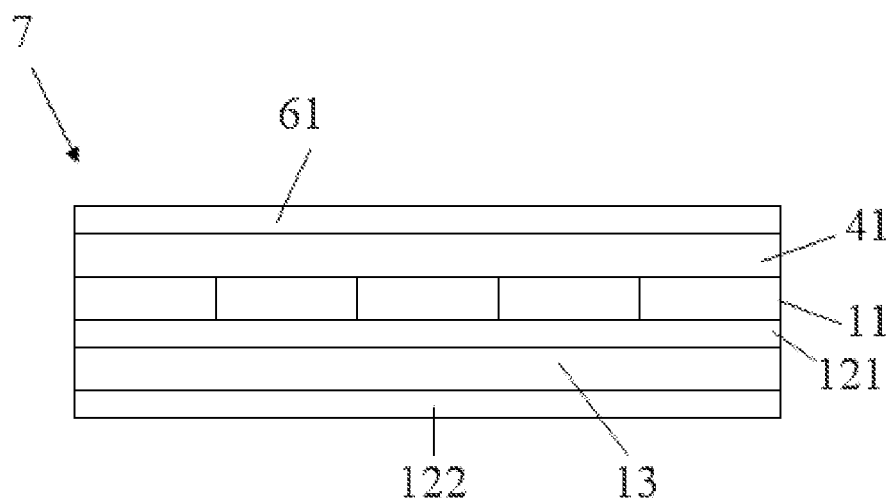
Figure 9:
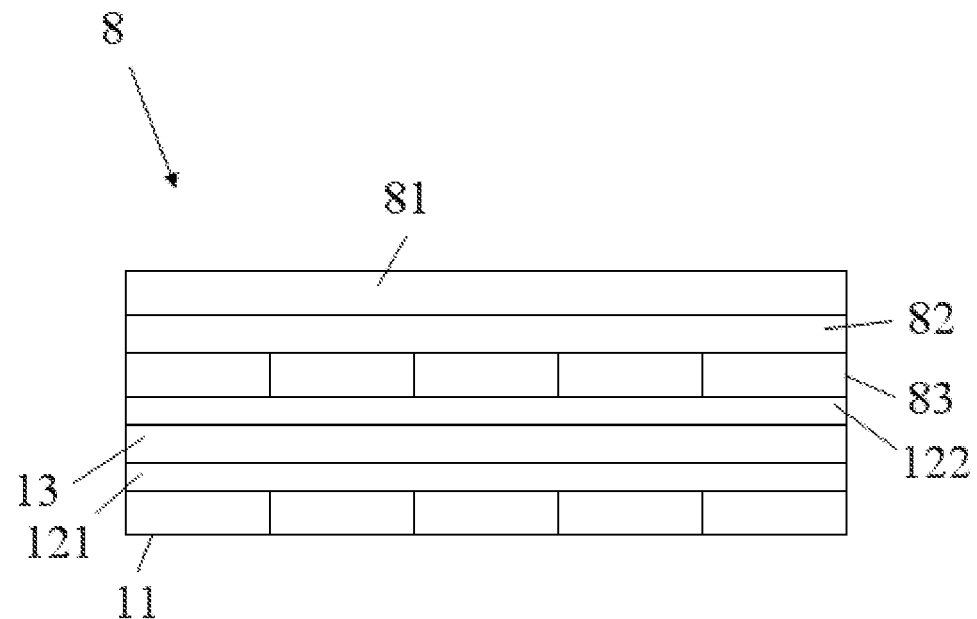
FIG. 9 is a schematic diagram showing a stereoscopic image display device.
Figure 10:
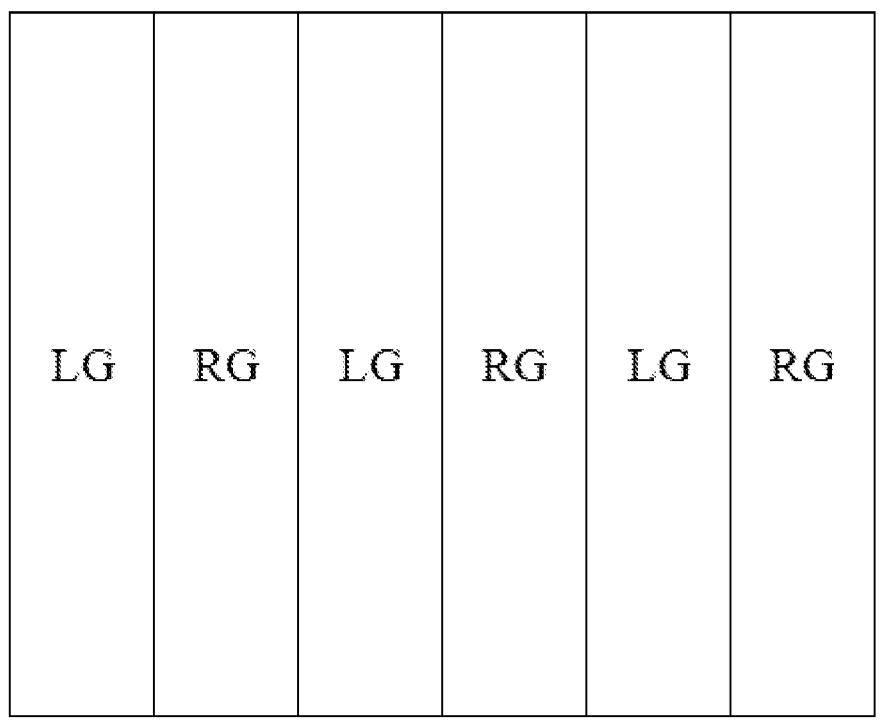

A crosstalk ratio may be defined as a ratio of luminance in a dark state and a bright state when a stereoscopic image is observed. In Examples and Comparative Examples, on the assumption that the optical element is applied to a stereoscopic image display device of a passive glasses type, a crosstalk ratio is measured using the following method. The optical element is used to constitute a stereoscopic image display device as shown in FIG. 9. Therefore, the polarized glasses for observing a stereoscopic image is disposed in a conventional observation point for the stereoscopic image display device. As such, when a stereoscopic image is observed by an observer, the conventional observation point refers to a point which is disposed away from the center of the stereoscopic image display device by a distance corresponding to ³⁄₂ of a length in a horizontal direction of the stereoscopic image display device. In such a point, the polarized glasses are positioned on the assumption that the center of the display device is observed by an observer. As such, when it is assumed that the stereoscopic image is observed by the observer, the length in the horizontal direction of the stereoscopic image display device may be a length in a horizontal direction as viewed from the observer, for example, a width of the image display device. In such an arrangement, a luminometer (equipment name: SR-UL2 Spectrometer) is arranged in rear surfaces of lenses of for the left and right eyes in the polarized glasses in a state where the stereoscopic image display device outputs an L signal, and each of the lenses for the left and right eyes is measured for luminance. The luminance measured in the rear surface of the lens for the left eye is bright-state luminance, and the luminance measured in the rear surface of the lens for the right eye is dark-state luminance. After measurement of each luminance, a ratio of the bright-state luminance to the dark-state luminance ([dark-state luminance]/[bright-state luminance]) is converted into a percentage value (%), which may be defined as a crosstalk ratio (Y). Also, the crosstalk ratio may be measured in the same manner as described above, and the luminance in the bright and dark states may be measured in a state where a stereoscopic image display device outputs an R signal. In this case, the luminance measured in the rear surface of the lens for the left eye is dark-state luminance, and the luminance measured in the rear surface of the lens for the right eye is bright-state luminance. Similarly, a ratio of the dark-state luminance to the bright-state luminance is converted into a percentage value (%), which may be defined as a crosstalk ratio.

Preparative Example 1

Preparation of Acrylic Polymer (A)

99 parts by weight of n-butyl acrylate (n-BA) and 1 part by weight of 2-hydroxyethyl acrylate (2-HEA) were put into a 1 L reactor equipped with a cooling device to keep a nitrogen gas under reflux and facilitate temperature control. Thereafter, 120 parts by weight of ethyl acetate (EAc) was put into the reactor as a solvent, and the reactor was purged with a nitrogen gas for 60 minutes to remove oxygen. Then, a temperature in the reactor was maintained at 60° C., and 0.03 parts by weight of azobisisobutyronitrile (AIBN), and the resulting mixture was subjected to a polymerization reaction to prepare an acrylic polymer (A) having a molecular weight of 1,700,000 and a molecular weight distribution of 3.9.

Preparative Example 2

Preparation of Acrylic Polymer (B)

An acrylic polymer (B) having a molecular weight of 1,800,000 and a molecular weight distribution of 4.5 was prepared in the same manner as in Preparative Example 1, except that 79 parts by weight of n-BA, 20 parts by weight of methoxy ethyleneglycol acrylate (MEA) and 1.0 part by weight of hydroxyethyl acrylate (HEA) were put into a 1 L reactor equipped with a cooling device to keep a nitrogen gas under reflux and facilitate temperature control.

Preparative Example 3

Preparation of Pressure-Sensitive Adhesive Layer (A)

1.0 part by weight of a multifunctional cross-linking agent (i.e., xylylene diisocyanate as XDI-based isocyanate) was blended relative to 100 parts by weight of the acrylic polymer (A) to prepare a pressure-sensitive adhesive composition. The prepared pressure-sensitive adhesive composition was coated on a release-treated surface of a PET film (thickness: 38 μm, MRF-38 commercially available from Mitsubishi) to a thickness after drying of 25 μm, and dried and aged at an appropriate temperature so that a curing process could properly take place, thereby preparing a pressure-sensitive adhesive layer (A) having a storage modulus at 25° C. of approximately 0.04 to 0.06 MPa.

Preparative Example 4

Preparation of Pressure-Sensitive Adhesive Layer (B)

100 parts by weight of an acrylic polymer (B), 3 parts by weight of a multifunctional cross-linking agent (i.e., xylylene diisocyanate as XDI-based isocyanate), 20 parts by weight of a multifunctional acrylate (trifunctional urethane acrylate commercially available from Aronix M-315, DONGWOO Co., Ltd), 2 parts by weight of a photoinitiator hydroxycyclohexylphenyl ketone (Irg 184 commercially available from Ciba Specialty Chemicals, Switzerland), and 0.2 parts by weight of a silane coupling agent having a β-cyanoacetyl group (M812 commercially available from LG Chem Ltd., Korea) were blended in a solvent so that a solid concentration could amount to 30% by weight to prepare a pressure-sensitive adhesive composition. Thereafter, the prepared pressure-sensitive adhesive composition was coated on a release-treated surface of a PET film (thickness: 38 μm, MRF-38 commercially available from Mitsubishi) to a thickness after drying of 25 μm, and dried in an oven at 110° C. for 3 minutes. Then, a release-treated surface of another PET film (thickness: 38 μm, MRF-38 commercially available from Mitsubishi) was further laminated on the dried coating layer, and the coating layer was irradiated with UV rays (illuminance: 600 mW/cm$^2$, light intensity: 150 mJ/cm$^2$) to prepare a pressure-sensitive adhesive layer (B) having a storage modulus at 25° C. of approximately 0.10 to 0.15 MPa.

Preparative Example 5

Preparation of Phase Retardation Layer (A)

A composition for forming a photo alignment layer was coated on one surface of a TAC substrate (refractive index: 1.49, thickness: 80,000 nm) to a thickness after drying of approximately 1,000 Å, and dried in an oven at 80° C. for 2 minutes. As the composition for forming a photo alignment layer as described above, a composition (polynorbornene: acryl monomer:photoinitiator=2:1:0.25 (weight ratio)), which was prepared by mixing a mixture of an acryl monomer and polynorbornene (molecular weight ($M_w$)=150,000) containing a cinnamate group represented by the following Formula 4 with a photoinitiator (Igacure 907) and dissolving the mixture in a toluene solvent so that a solid concentration of the polynorbornene could amount to 2% by weight, was used.

Formula 4

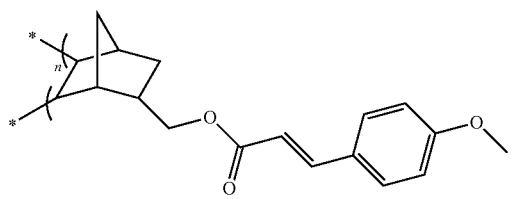

Next, the dried composition for forming a photo alignment layer was aligned according to the method disclosed in Korean Patent Application No. 2010-0009723 to form a photo alignment layer including first and second alignment regions which are aligned in different directions. More particularly, a pattern mask in which light transmitting portions and light intercepting portions in stripe shapes having widths of approximately 450μ are alternately formed in a vertical direction and a horizontal direction were disposed on an upper portion of the dried composition, and a polarizing plate having two regions formed therein for transmitting two kinds of polarized light was also disposed on an upper portion of the pattern mask. Then, the composition for forming a photo alignment layer was aligned by irradiating the composition with UV rays (300 mW/cm$^2$) for approximately 30 seconds using the polarizing plate and pattern mask while transferring the TAC substrate 30 having the photoalignment layer formed therein at a rate of approximately 3 m/min. Then, a liquid crystal layer was formed on the alignment layer undergoing the alignment treatment. More particularly, a liquid crystal compound (LC242™ commercially available from BASF) was coated onto the photo alignment layer to a dry thickness of approximately 1 μm, and the liquid crystal compound was aligned according to the alignment of the alignment layer arranged under the liquid crystal layer. Then, a liquid crystal layer, which includes first and second regions having different optical axes perpendicular to each other according to the alignment of the photo alignment layer arranged under the liquid crystal layer, was formed by cross-linking and polymerizing liquid crystals by irradiating the liquid crystals with UV rays (300 mW/cm$^2$) for approximately 10 seconds. In the liquid crystal layer, a difference between refractive indexes in a slow axis direction and a fast axis direction was approximately 0.125.

Preparative Example 6

Preparation of Phase Retardation Layer (B)

10 g of urethane acrylate, 20 g of dipentaerythrito hexaacrylate (DPHA), 1 g of organic particles having an average particle size of 3,500 nm and an average surface roughness (Rz) of 30 nm (commercially available from Sekisui), 1 g of organic particles having an average particle size of 4,000 nm, a maximum surface height of 300 nm and a protrusion width of approximately 800 nm (commercially available from Sekisui), 30 g of methylethylketone, 38 g of toluene and 2 g of a radical photoinitiator were homogeneously mixed to prepare a resin composition (i.e., a coating solution). Then, the prepared coating solution was coated onto one surface of the same TAC substrate as used in Preparative Example 5 to a thickness after drying of approximately 4,500 nm using a roll coating method, and dried. The dried coating solution was cured by irradiation with UV rays (280 mJ/cm$^2$) to form a surface-treated layer (i.e., an SG layer). Thereafter, a phase retardation layer (B) was prepared in the same manner as described in Preparative Example 5 by sequentially forming an alignment layer and a liquid crystal layer on a surface of the TAC substrate opposite to the surface on which the SG layer was formed.

Preparative Example 7

Preparation of Protective Substrate Having a Surface-Treated Layer 10 g of urethane acrylate, 20 g of DPHA, 1 g of organic particles having an average particle size of 3,500 nm and an average surface roughness (Rz) of 30 nm (commercially available from Sekisui), 1 g of organic particles having an average particle size of 4,000 nm, a maximum surface height of 300 nm and a protrusion width of approximately 800 nm (commercially available from Sekisui), 30 g of methylethylketone, 38 g of toluene and 2 g of a radical photoinitiator were homogeneously mixed to prepare a resin composition (i.e., a coating solution). Then, the prepared coating solution was coated onto one surface of the same TAC substrate as used in Preparative Example 5 to a thickness after drying of approximately 4,500 nm using a roll coating method, and dried. The dried coating solution was cured by irradiation with UV rays (280 mJ/cm$^2$) to form a surface-treated layer (i.e., an SG layer).

Example 1

Optical Element (A)

A polarizing plate in which TAC protective films were attached to both surfaces of a PVA-based polarizer was used to prepare an optical element. More particularly, a pressure-sensitive adhesive layer (B) was laminated on one surface of the polarizing plate, and a surface of a liquid crystal layer of the phase retardation layer prepared in Preparative Example 5 was laminated on the other surface of the polarizing plate using the pressure-sensitive adhesive layer (B). Then, a surface-treated layer-free surface of the TAC substrate having the surface-treated layer formed therein as prepared in Preparative Example 7 was attached to the polarizing plate using the pressure-sensitive adhesive layer (B) to prepare an optical element.

Example 2

Optical Element (B)

A polarizing plate in which TAC protective films were attached to both surfaces of a PVA-based polarizer was used to prepare an optical element. More particularly, a pressure-sensitive adhesive layer (B) was laminated on one surface of the polarizing plate, and a surface of a liquid crystal layer of the phase retardation layer prepared in Preparative Example 5 was laminated on the other surface of the polarizing plate using the pressure-sensitive adhesive layer (A). Then, a surface-treated layer-free surface of the TAC substrate having the surface-treated layer formed therein as prepared in Preparative Example 7 was attached to the polarizing plate using the pressure-sensitive adhesive layer (B) to prepare an optical element.

Example 3

Optical Element (C)

A polarizing plate in which TAC protective films were attached to both surfaces of a PVA-based polarizer was used to prepare an optical element. More particularly, a pressure-sensitive adhesive layer (B) was laminated on one surface of the polarizing plate, and a surface of a liquid crystal layer of the phase retardation layer prepared in Preparative Example 6 was attached to the other surface of the polarizing plate using the pressure-sensitive adhesive layer (A), thereby preparing an optical element.

Comparative Example 1

Optical Element (D)

A polarizing plate in which TAC protective films were attached to both surfaces of a PVA-based polarizer was used to prepare an optical element. More particularly, a pressure-sensitive adhesive layer (B) was laminated on one surface of a polarizing plate, and a surface of a liquid crystal layer of the phase retardation layer prepared in Preparative Example 5 was laminated on the other surface of the polarizing plate using the pressure-sensitive adhesive layer (A). Then, a surface-treated layer-free surface of the TAC substrate having the surface-treated layer formed therein as prepared in Preparative Example 7 was attached to the polarizing plate using the pressure-sensitive adhesive layer (B) to prepare an optical element.

Experimental Example 1

Measurement of Dimensional Change Rate

The respective optical elements prepared in Examples and Comparative Examples were evaluated for durability. More particularly, each of the optical elements was attached to a glass substrate by means of a pressure-sensitive adhesive layer formed on an opposite side of a phase retardation layer in the polarizing plate, and then kept at 60° C. and a relative humidity of 10% for 150 hours, 300 hours and 500 hours. Thereafter, a variation in width was measured and is listed in the following Table 1. In Table 1, three optical elements prepared in the same manner were kept for 150 hours, 300 hours or 500 hours under the above-described conditions, and measured for an average value of the variation, and the symbol "—" means that the width was reduced after being kept.

TABLE 1

|  | Kept for 150 hours | Kept for 300 hours | Kept for 500 hours |
| --- | --- | --- | --- |
| Example 1 | −63 nm | −66 nm | −73 nm |
| Example 2 | −82 nm | −91 nm | −100 nm |
| Example 3 | −28 nm | −35 nm | −41 nm |
| Comparative Example 1 | −235 nm | −241 nm | −253 nm |

Experimental Example 2

Evaluation of Refractive Index Relationship of Liquid Crystal Layer and Light Division Property According to Thickness In order to evaluate the refractive index relationship of a liquid crystal layer and a light division property of the liquid crystal layer according to a thickness, a sample was prepared, as will be described later. More particularly, a phase retardation layer was formed in the same manner as in Preparative Example 5, wherein the phase retardation layer was prepared by forming liquid crystal layers having thicknesses of approximately 0.3 μm, 1 μm and 2.5 μm, respectively, by adjusting compositions of a liquid crystal mixture so that a difference between refractive indexes in a slow axis direction and a fast axis direction could be in a range of 0.03 after forming the liquid crystal layer. Also, a phase retardation layer was prepared in the same manner using the same liquid crystal compound as in Preparative Example 5, wherein the phase retardation layer was prepared by forming liquid crystal layers having thicknesses of approximately 0.3 μm and 2.5 μm. Also, a phase retardation layer was formed in the same manner as in Preparative Example 5, wherein the phase retardation layer was prepared by forming liquid crystal layers having thicknesses of approximately 0.3 μm, 1 μm and 2.5 μm, respectively, by adjusting compositions of a liquid crystal mixture so that a difference between refractive indexes in a slow axis direction and a fast axis direction could be in a range of 0.22 after forming the liquid crystal layer. Thereafter, an optical element was prepared in the same manner as in Example 1 using the prepared phase retardation layer, and crosstalk ratios obtained when the prepared optical element and the optical element of Example 1 were used to observe a stereoscopic image were evaluated. The results are listed in the following Table 2.

TABLE 2

Liquid crystal layer of phase retardation layer

| Refractive index difference* | Thickness (μm) | Crosstalk ratio (%) |
| --- | --- | --- |
| 0.03 | 0.3 | 79.5 |
| 0.03 | 1 | 45.3 |
| 0.03 | 2.5 | 10.3 |
| 0.125 | 0.3 | 36 |
| 0.125 | 1 | 0.5 |
| 0.125 | 2.5 | 177.4 |
| 0.22 | 0.3 | 14.6 |
| 0.22 | 1 | 30.7 |
| 0.22 | 2.5 | 121.6 |

Refractive index difference represents a difference between in-plane refractive indexes of a liquid crystal layer in a slow axis direction and fast axis direction.

The optical element according to one exemplary embodiment of the present invention shows excellent durability, hardness property and reworkability. Therefore, the optical element can have a stable light division property since the phase retardation property of the phase retardation layer in the optical element can be stably maintained for a long period of time under the severe conditions. Also, it is possible to prevent side effects such as light leakage in an optical instrument to which the optical element is applicable. Also, the optical element can show excellent resistance to an external pressure or scratch.

Explanation of Marks 1, 4, 5, 6, 7: Optical Element
11: Phase Retardation Layer
121, 122: Pressure-Sensitive Adhesive Layer
13: Polarizing Plate
A: First Regions of Liquid Crystal Layer
B: Second Regions of Liquid Crystal Layer
L: Boundary Line between First Regions and Second Regions
Θ1, Θ2: Angle Formed Between Optical Axes of the First Regions or Second Regions and Boundary Line
41: substrate layer
51: Protective Substrate Layer
61: Surface-Treated Layer
8: Stereoscopic Image Display Device
81: Light Source
82: Polarizing Plate
83: Image Display Element
LG: Image Signal-Generating Region for Left Eye for Generating L signal
RG: Image Signal-Generating Region for Right Eye for Generating R signal

What is claimed is:

1. An optical element comprising:
a phase retardation layer comprising a liquid crystal layer, of which a difference between in-plane refractive indexes in a slow axis direction and a fast axis direction is 0.05 to 0.2 and which has a thickness of 0.5 μm to 2.0 μm, and comprises a polymerizable liquid crystal compound; a polarizing plate which is attached to the phase retardation layer by a first pressure-sensitive adhesive layer and comprises a polarizer; and
a second pressure-sensitive adhesive layer that is formed on a side, to which the first pressure sensitive adhesive is not attached, of the polarizing plate, and has a storage modulus at 25° C. of greater than 0.08 MPa,
wherein the second pressure-sensitive adhesive layer comprises a cross-linking structure comprising an acrylic polymer cross-linked by a multifunctional cross-linking agent and a cross-linking structure comprising a polymerized active energy ray-polymerizable compound.

2. The optical element of claim 1, wherein the polymerizable liquid crystal compound comprises a multifunctional polymerizable liquid crystal compound and a monofunctional polymerizable liquid crystal compound.

3. The optical element of claim 1, wherein the liquid crystal layer comprises first and second regions having different phase retardation properties to each other.

4. The optical element of claim 3, wherein the first and second regions have optical axes formed in different directions to each other, and a line bisecting an angle formed by the optical axes of the first and the second regions is perpendicular or parallel to the absorption axis of the polarizer.

5. The optical element of claim 1, wherein the first pressure-sensitive adhesive layer has a storage modulus at 25° C. of 0.02 MPa or more.

6. The optical element of claim 1, wherein the first and second pressure-sensitive adhesive layers have a thickness of 25 µm or less, respectively.

7. The optical element of claim 1, wherein the active energy ray-polymerizable compound is a multifunctional acrylate.

8. The optical element of claim 1, further comprising:
a substrate layer which is formed on the side, on which the first pressure-sensitive adhesive layer is not attached, of the phase retardation layer and on which the liquid crystal layer comprised in the phase retardation layer is formed; and
a protective substrate layer which is attached to the side, on which the liquid crystal layer is not formed, of the substrate layer by a third pressure-sensitive adhesive layer.

9. The optical element of claim 8, wherein the first pressure-sensitive adhesive layer has a storage modulus at 25° C. of 0.02 MPa to 0.08 MPa, and comprises a cross-linking structure comprising an acrylic polymer cross-linked by a multifunctional cross-linking agent.

10. The optical element of claim 8, wherein the first pressure-sensitive adhesive layer has a storage modulus at 25° C. of greater than 0.08 MPa, and comprises a cross-linking structure comprising an acrylic polymer cross-linked by the multifunctional cross-linking agent and a cross-linking structure comprising a polymerized active energy ray-polymerizable compound.

11. The optical element of claim 8, wherein the third pressure-sensitive adhesive layer has a storage modulus at 25° C. of greater than 0.08 MPa, and comprises a cross-linking structure comprising an acrylic polymer cross-linked by the multifunctional cross-linking agent and a cross-linking structure comprising a polymerized active energy ray-polymerizable compound.

12. The optical element of claim 8, further comprising a surface-treated layer formed on a surface of the protective substrate layer.

13. The optical element of claim 12, wherein the surface-treated layer is a high-hardness layer, a glare-preventing layer or a low-reflective layer.

14. The optical element of claim 1, further comprising:
a substrate layer which is formed on the side, on which the first pressure-sensitive adhesive layer is not attached, of the phase retardation layer and on which the liquid crystal layer comprised in the phase retardation is formed; and
a surface-treated layer which is formed on a surface, on which the liquid crystal layer is not formed, of the substrate layer.

15. The optical element of claim 14, wherein the first pressure-sensitive adhesive layer has a storage modulus at 25° C. of 0.02 MPa to 0.08 MPa, and comprises a cross-linking structure comprising an acrylic polymer cross-linked using a multifunctional cross-linking agent.

16. The optical element of claim 14, wherein the surface-treated layer is a high-hardness layer, a glare-preventing layer or a low-reflective layer.

17. The optical element of claim 1, wherein the optical element satisfies the following Equation 1:

$$X \leq 200 \text{ nm} \qquad \text{Equation 1}$$

wherein X represents a variation in a width or length direction of the optical element, as measured after attaching the optical element to a glass substrate by the second pressure-sensitive adhesive layer and then maintaining it at 60° C. and a relative humidity of 10% for 150 hours.

18. A stereoscopic image display device comprising an optical element according to claim 1.

19. The stereoscopic image display device of claim 18, further comprising an image display element configured to generate image signals for left and right eyes.

20. The stereoscopic image display device of claim 19, wherein the liquid crystal layer of the optical element comprises first and second regions having different phase retardation properties to each other, and the optical element is attached to the image display element by the second pressure-sensitive adhesive layer so that the image signal for the left eye can pass through one of the first and second regions of the liquid crystal layer and the image signal for the right eye can pass through the other region of the liquid crystal layer.

* * * * *